United States Patent
Michel

(10) Patent No.: US 10,467,073 B2
(45) Date of Patent: Nov. 5, 2019

(54) ELECTRONIC SYSTEM COMPRISING ELECTRONIC DEVICES, CIRCUIT BREAKER COMPRISING SUCH A SYSTEM, METHOD FOR GENERATING A DEVIATION INDICATOR IN THE EVENT OF INCOMPATIBILITY BETWEEN DEVICES AND ASSOCIATED COMPUTER PROGRAM PRODUCT

(71) Applicant: Schneider Electric Industries SAS, Rueil-Malmaison (FR)

(72) Inventor: Julien Michel, La Chavanne (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 535 days.

(21) Appl. No.: 14/632,100

(22) Filed: Feb. 26, 2015

(65) Prior Publication Data
US 2015/0254120 A1    Sep. 10, 2015

(30) Foreign Application Priority Data

Mar. 7, 2014    (FR) ...................................... 14 51908

(51) Int. Cl.
*H02H 7/00* (2006.01)
*G06F 11/00* (2006.01)
(Continued)

(52) U.S. Cl.
CPC ............... *G06F 11/00* (2013.01); *G06F 8/60* (2013.01); *G06F 15/16* (2013.01); *H02H 7/261* (2013.01)

(58) Field of Classification Search
CPC .......... H02H 7/261; G06F 11/00; G06F 15/16
(Continued)

(56) References Cited

U.S. PATENT DOCUMENTS 5,579,509 A    11/1996    Furtney et al.
6,216,186 B1 *  4/2001    Mayhead ............... G06F 11/006
                                                 710/301
(Continued)

FOREIGN PATENT DOCUMENTS

EP      0 498 130 A2    8/1992
WO      WO 99/66409     12/1999
WO      WO 2005/106605 A1    11/2005

OTHER PUBLICATIONS

FR 3018367 (A1) Abstract from Espacenet from search on Jul. 20, 2017.*
(Continued)

*Primary Examiner* — Thienvu V Tran
*Assistant Examiner* — Lucy M Thomas
(74) *Attorney, Agent, or Firm* — Oblon, McClelland, Maier & Neustadt, L.L.P.

(57) ABSTRACT

The electronic system according to the invention comprises a set of electronic devices, each electronic device comprising a memory and a communication module for communicating with one or more other devices of the set.
This electronic system comprises a module for verifying the compatibility of each device with the other complementary device(s) with which said device is adapted to communicate, and a module for generating at least one deviation indicator when an incompatibility is detected between two devices.
The memory comprises a compatibility table with said other complementary device(s), each compatibility table comprising a minimum required version number for each of the other complementary devices, and each verification module is adapted for comparing a version number of each other complementary devices with the minimum required version number.

13 Claims, 4 Drawing Sheets

(51) Int. Cl.
*G06F 8/60* (2018.01)
*G06F 15/16* (2006.01)
*H02H 7/26* (2006.01)

(58) Field of Classification Search
USPC .......................................................... 361/64
See application file for complete search history.

(56) References Cited

U.S. PATENT DOCUMENTS

| | | |
|---|---|---|
| 6,898,768 B1 | 5/2005 | Theodossy et al. |
| 8,250,137 B1 * | 8/2012 | Nielsen ............... H04L 41/5058 |
| | | 709/203 |
| 2007/0032917 A1 | 2/2007 | Behr |
| 2010/0124196 A1 * | 5/2010 | Bonar .................. H04B 7/0689 |
| | | 370/329 |

OTHER PUBLICATIONS

US2015254120 ABstract from Espacenet, including list of related document (with complete/correct foreign priority application No. FR20140051908 and application publication No. FR3018367) from search on Jul. 20, 2017.*

French Preliminary Search Report dated Oct. 21, 2014 in French Application 14 51908, filed on March 7, 2014 (with English Translation of Categories of Cited Documents), *FR20140051908.

* cited by examiner

ELECTRONIC SYSTEM COMPRISING ELECTRONIC DEVICES, CIRCUIT BREAKER COMPRISING SUCH A SYSTEM, METHOD FOR GENERATING A DEVIATION INDICATOR IN THE EVENT OF INCOMPATIBILITY BETWEEN DEVICES AND ASSOCIATED COMPUTER PROGRAM PRODUCT

BACKGROUND OF THE INVENTION

The present invention relates to an electronic system comprising a set of electronic devices. Each electronic device comprises a memory and a communication module for communicating with one or more other devices of the set. The system comprises at least one module for verifying the compatibility of each device with the other complementary device(s) with which said device is adapted to communicate, and at least one module for generating at least one deviation indicator when an incompatibility is detected between two devices.

The present invention also relates to an electric circuit breaker comprising a triggering unit and one such electronic system.

The present invention also relates to a method for generating at least one deviation indicator for an electronic device when an incompatibility with at least one other device of an electronic system is detected.

The present invention also relates to a computer program product comprising software instructions which, when executed by a computer, implement such a generating method.

The invention in particular relates to the field of systems for communicating products, which are becoming increasingly modular in order to meet users' flexibility needs, in which the communicating products are regularly updated, in particular based on user requirements. It is then necessary to verify the compatibility of the communicating products of a same system, in order to be able to manage any incompatibility issues between two respective communicating products.

A system of the aforementioned type is known from document US 2006/0130073 A1. The system comprises a first device equipped with a first processor and a first memory and a second device equipped with a second processor and a second memory. The second device is a device for controlling the first device, the second memory comprising a driver for controlling the first device, and a database comprising a driver identification number, as well as an identification number for application software stored in the first memory.

The second processor is adapted for comparing said identification numbers in order to detect any incompatibility and, if necessary, is adapted to launch an update of the software requiring it. The information relative to the identification of the different software, in order to determine the respective versions, is centralized in the database and stored in the second memory. It can be sent to the first processor so that if applicable, it compares the identification numbers itself.

However, the compatibility verification within such a system is relatively complex, in particular when a new device is added with the necessary update to the centralized database.

SUMMARY OF THE INVENTION

The aim of the invention is therefore to propose a more upgradable system in which the compatibility verification between devices remains easy to perform, even when a new device is added to the system.

To that end, the invention relates to an electronic system of the aforementioned type, in which the memory of each device comprises at least one compatibility table for defining compatibility with said other complementary device(s), each compatibility table comprising at least one minimum required version number for each of said other complementary device(s), and each verification module is adapted for comparing, for one or more given devices, a version number of each of said other complementary device(s) with the corresponding minimum required version number.

With the electronic system according to the invention, each device comprises a compatibility table for defining compatibility with one or more other complementary device(s), the complementary device(s) being the devices with which said device is adapted to communicate, each compatibility table comprising at least one minimum required version number for each of said other complementary device(s). In other words, the data making it possible to verify compatibility between complementary devices are distributed between the devices, and unlike the system of the state of the art, are not centralized in a master device.

According to other advantageous aspects of the invention, the electronic system comprises one or more of the following features, considered alone or according to any technically possible combinations:

- at least one electronic device comprises at least one hardware function, and each corresponding compatibility table comprises, for each hardware function, a minimum required version number for each of the other complementary device(s);
- at least one electronic device comprises at least one software function, and each corresponding compatibility table comprises, for each software function, a minimum required version number for each of the other complementary device(s);
- each generating module is adapted for generating a unitary deviation indicator for each device having an incompatibility with at least one other complementary device;
- at least one generating module is adapted for generating a global deviation indicator when two complementary devices are incompatible;
- several compatibility levels are associated with at least one device, and each corresponding compatibility table comprises, for each compatibility level, a minimum required version number for each of said other complementary device(s);
- each verification module is integrated into a respective electronic device; and
- at least one device comprises a module for delegating the compatibility verification to another device comprising a verification module, and the delegating module is adapted for sending said verification module the version numbers contained in the compatibility table of the device that comprises said delegating module.

The invention also relates to an electric circuit breaker comprising a triggering unit and an electronic system, in which the electronic system is as defined above.

The invention also relates to a method for generating at least one deviation indicator for an electronic device when an incompatibility with at least one other device of an electronic system is detected, the electronic system comprising a set of electronic devices, each electronic device comprising a memory and a communication module for communicating with one or more other devices of the set, the method comprising the following steps:
verifying the compatibility of the device with the other complementary device(s) with which said device is adapted to communicate,
generating at least one deviation indicator for the electronic device when an incompatibility with at least one other complementary device is detected,
wherein the memory of each device comprises at least one compatibility table for defining compatibility with said other complementary device(s), each compatibility table comprising at least one minimum required version number for each of said other complementary device(s), and
during the verification step, a version number for each of said other complementary device(s) is compared with the corresponding minimum required version number.

The invention also relates to a computer program product comprising software instructions which, when run by a computer, carry out a method as defined above for generating at least one deviation indicator.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF PREFERRED EMBODIMENTS

By convention, in the rest of the description, a module is understood broadly speaking, and is synonymous with means.

Figure 1:
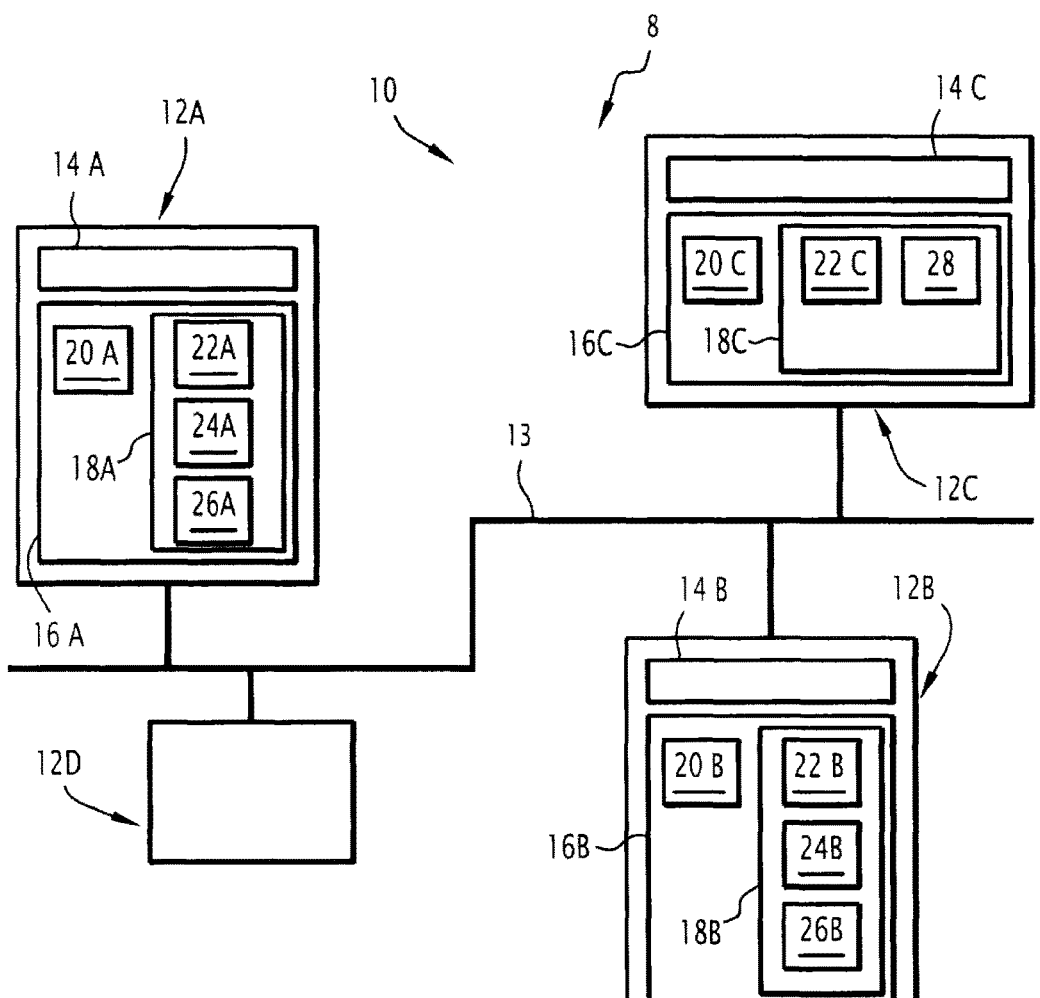
FIG. 1 is a very diagrammatic illustration of a circuit breaker comprising an electronic system according to the invention, the electronic system comprising four electronic devices.

In FIG. 1, an electric circuit breaker 8 comprises a triggering unit, not shown, and an electronic system 10. The triggering unit is known in itself, and is not described in more detail.

The electronic system 10 comprises four electronic devices 12A, 12B, 12C, 12D, i.e., a first device 12A, a second device 12B, a third device 12C, and a fourth device 12D, and a communication bus 13 connecting the electronic devices 12A, 12B, 12C, 12D to each other.

The electronic devices 12A, 12B, 12C, 12D are for example a man-machine interface, also called FDM (Front Display Module), a network interface device, for example an interface device with a Modbus network, also called IFM (InterFace Modbus), an interface device with the circuit breaker triggering unit 8, such as a BCM (Breaker Control Module) device or a BSCM (Breaker Status Control Module) device. The electronic devices 12A, 12B, 12C, 12D are also for example a maintenance device, also called UTA (USB Tool Adapter) and an input/output device, also denoted I/O Module (Input/Output Module) and designed to provide information relative to the system as output and to acquire information about the system as input.

The electronic devices 12A, 12B, 12C, 12D are preferably chosen from the group consisting of: a man-machine interface device FDM, a network interface device IFM, a BCM or BSCM interface device with the triggering unit of the circuit breaker, a maintenance device UTA, an input/output device and a triggering unit comprising communication means.

The first electronic device 12A comprises a first communication module 14A for communicating with one or more other devices 12B, 12C, 12D of the set. The first electronic device 12A also comprises a first information processing unit 16A for example made up of a first memory 18A and a first processor 20A associated with the first memory.

By convention, in the rest of the description, the devices with which a given device is adapted to communicate are called complementary devices. In other words, a given device is not assumed to be compatible with all of the other devices in the system, and the devices with which a given device is considered to be compatible are the complementary devices.

The second electronic device 12B, respectively the third electronic device 12C and the fourth electronic device 12D, comprise the same elements as the first electronic device 12A previously described, each time replacing first by second, third and fourth elements, respectively, for which the references are obtained by replacing the letter A with the letter B, C or D, respectively. In FIG. 1, the elements contained in the fourth electronic device 12D have not been shown in order to simplify the drawings.

Each electronic device 12A, 12B, 12C, 12D comprises one or more hardware and/or software functions, not shown.

The communication bus 13 is for example a wired bus, internal to the circuit breaker 8 and connecting the various electronic devices 12A, 12B, 12C, 12D. The bus 13 is adapted for allowing a data exchange between those devices 12A, 12B, 12C, 12D. The communication modules 14A, 14B, 14C, 14D are then modules for interfacing with the internal communication bus 13.

In an alternative that is not shown, the communication bus 13 is in the form of a wireless data link, and the communication modules 14A, 14B, 14C, 14D are then wireless communication modules.

A hardware function is any function implemented by a hardware component, i.e., by an electronic component or a set of electronic components. Each electronic component is for example an electronic memory adapted for storing data, an input/output component, a component interfacing with a communication link, such as a serial link, a USB link, an Ethernet link, a Wi-Fi link, etc. As an additional example, an electronic component may be a programmable logic component, also called FPGA (Field Programmable Gate Array), or a dedicated integrated circuit, also called ASIC (Application Specific Integrated Circuit), or any other electronic component, irrespective of whether it is programmable.

A software function refers to any function carried out by a software component, whether it involves firmware or application software. A software function thus broadly refers to a set of software instructions adapted for carrying out said function when they are executed by a processor.

According to the invention, each memory 18A, 18B, 18C, 18D comprises a compatibility table 22A, 22B, 22C, 22D for defining compatibility with said other complementary device(s), each compatibility table 22A, 22B, 22C, 22D comprising at least one minimum required version number for each of said other complementary device(s).

Each memory 18A, 18B, 18C, 18D further comprises a version number, not shown, for each hardware or software function integrated into the electronic device 12A, 12B, 12C, 12D that comprises said memory 18A, 18B, 18C, 18D.

The first memory 18A is adapted for storing software 24A for verifying the compatibility of the first device 12A with the other complementary device(s) with which the device is adapted to communicate, and software 26A for generating at least one deviation indicator when an incompatibility is detected between two devices. The first processor 20A is adapted for executing the software 24A, 26A stored in the first memory 18A.

The second memory 18B is adapted for storing the same software as the first memory 18A, for which software the references are obtained by replacing the letter A with the letter B. The second processor 20B is, similarly, adapted for executing the software 24B, 26B stored in the second memory 18B.

The third memory 18C is not designed to store verification software and generating software, but is adapted for storing software 28 for delegating the compatibility verification to another device, such as the first device 12A, as will be described in more detail in reference to FIG. 6. This other device, to which the verification is delegated, comprises a corresponding verification module 24A, and the delegation software 28 is adapted for sending said verification module 24A the values contained in the compatibility table 22C of the device that comprises said delegating module 28.

The third processor 20C is adapted for executing the software 28 stored in the third memory 18C. The delegating software 28 thus respectively forms a delegating module. Alternatively, the delegating module 28 is made in the form of a programmable logic component or in the form of a dedicated integrated circuit.

The fourth memory 18D is adapted for storing the same software as the first memory 18A, for which software the references are obtained by replacing the letter A with the letter D. The fourth processor 20D is similarly adapted for executing the software 24D, 26D stored in the fourth memory 18D.

Each compatibility table 22A, 22B, 22C, 22D comprises, for the associated device 12A, 12B, 12C, 12D and in whose memory it is stored, at least one minimum version number required for each of said other complementary device(s) of that associated device.

Each compatibility table 22A, 22B, 22C, 22D is predetermined, i.e., predefined. Each compatibility table 22A, 22B, 22C, 22D is stored in the memory 18A, 18B, 18C, 18D of the corresponding device, preferably before the corresponding device 12A, 12B, 12C, 12D is inserted into the electronic system.

Additionally, each compatibility table 22A, 22B, 22C, 22D is updated when at least one function among the hardware and software function(s) of the associated device 12A, 12B, 12C, 12D is updated. This then makes it possible to add or remove one or more minimum required version numbers during that update, i.e., dynamically.

When an electronic device 12A, 12B, 12C, 12D comprises at least one hardware function, the corresponding compatibility table 22A, 22B, 22C, 22D comprises, for each hardware function, a minimum required version number for each of said other complementary device(s) of the electronic device and for the hardware function in question.

When an electronic device 12A, 12B, 12C, 12D comprises at least one software function, the corresponding compatibility table 22A, 22B, 22C, 22D comprises, for each software function, a minimum version number required for each of said other complementary device(s) of the electronic device and for the software function in question.

Alternatively, the minimum required version number corresponds directly to a version of the device, and each compatibility table 22A, 22B, 22C, 22D comprises a single minimum required version number for each of said other complementary device(s) of the device comprising said table 22A, 22B, 22C, 22D. In other words, according to this alternative, the compatibility is globally managed at the device level, and not individually at each of the functions integrated into the device.

As an optional addition, several compatibility levels are associated with each device 12A, 12B, 12C, 12D of the system, and each corresponding compatibility table 22A, 22B, 22C, 22D comprises, for each compatibility level, a minimum required version number for each of said other complementary device(s). When several compatibility levels are associated with a device comprising several hardware and/or software functions, the corresponding compatibility table 22A, 22B, 22C, 22D comprises a minimum required version number for each compatibility level and for each hardware or software function.

As an alternative to this optional addition, when the minimum required version number corresponds directly to a version number of the device and several compatibility levels are provided, each corresponding compatibility table 22A, 22B, 22C, 22D comprises, for each compatibility level, a single required minimum version number for each of said other complementary device(s).

Figure 5:
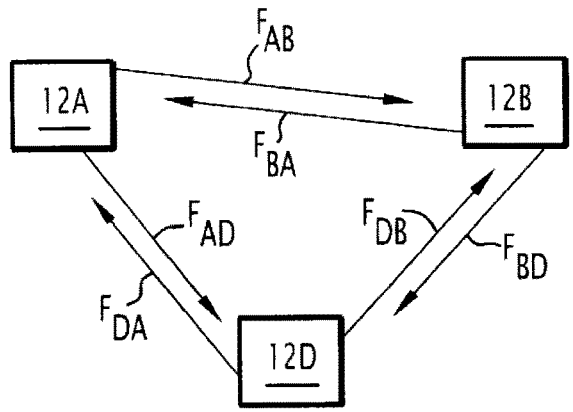
FIGS. 5 to 7 are diagrammatic illustrations of data exchanges between electronic devices of the system of FIG. 1, according to different example embodiments.

As an example corresponding to FIG. 5, the corresponding compatibility table 22A for the first device 12A is in the form of the following table 1:

TABLE 1

| | | Required FW version | | Required HW version | |
|---|---|---|---|---|---|
| | | Device 12B | Device 12C | Device 12B | Device 12C |
| Devi- | High | 0.1.5 | 2.2.0 | 001 | — |
| ation | Medium | 1.0.0 | — | 003 | — |
| level | Low | 1.2.0 | 4.0.0 | 010 | 002 | where required FW version represents the minimum version number required for the firmware function for each of the other two complementary devices, i.e., the second device 12B and the third device 12C, and according to three deviation levels, such as a high deviation level, a medium deviation level and a low deviation level, and where required HW version represents the minimum version number required for the hardware function for each of the other two complementary devices 12B, 12C and according to the three deviation levels.

One skilled in the art will note that the deviation level and the compatibility level are related concepts, in particular inversely proportional. The higher the deviation level is, the lower the compatibility level is. In other words, table 1 is equivalent to the following table 2:

TABLE 2

| | | Required FW version | | Required HW version | |
|---|---|---|---|---|---|
| | | Device 12B | Device 12C | Device 12B | Device 12C |
| Compat- | Low | 0.1.5 | 2.2.0 | 001 | — |
| ibility | Medium | 1.0.0 | — | 003 | — |
| level | High | 1.2.0 | 4.0.0 | 010 | 002 |

In the described example embodiment, the versions are numbered incrementally, and a given version, such as a version of a hardware or software function, is then compatible with the minimum required version for a selected compatibility level when the number associated with that given version is greater than or equal to the number of the minimum required version.

When the version numbering comprises several digits separated from each other by points '.', for example three digits separated by two points for the firmware version in the preceding tables, a version number is higher than another version number if the first digit from the left, also called significant digit, is greater than the corresponding significant digit of the other version, or if the digits of equal significance of the two versions are equal, if the following lower significance digit is greater than the corresponding lower significance digit of the other version.

In an alternative that is not shown, the versions are numbered decrementally, and a given version is then compatible with the minimum required version for a selected compatibility level when the number associated with that given version is less than or equal to the number of the minimum required version.

Also alternatively, the versions are numbered according to another mathematical ordering law, and a given version is then compatible with the minimum required version for a selected compatibility level when the number associated with that given version is, according to that ordering law, greater than or equal to the minimum required version number.

The verification software 24A, 24B, 24D and the generating software 26A, 26B, 26D each respectively form a verification module and a generating module. Alternatively, the verification modules 24A, 24B, 24D and the generating modules 26A, 26B, 26D are made in the form of programmable logic components or in the form of dedicated integrated circuits.

Each verification module 24A, 24B, 24D is incorporated into a respective electronic device 12A, 12B, 12D. Each verification module 24A, 24B, 24D is adapted for comparing, for the associated device 12A, 12B, 12D, the version number of each of the other complementary device(s) of said device with the corresponding minimum required version number, that minimum required version number being contained in the compatibility table 22A, 22B, 22D, as previously described. That minimum required version number depends on the considered function from among the hardware and software functions when several functions are taken into account in the compatibility table 22A, 22B, 22D, as well as any compatibility level, when several compatibility levels are associated with said device.

Each verification module 24A, 24B, 24D is then adapted for verifying that the version number of each of the other complementary device(s) is greater than or equal to the corresponding minimum required version number according to the ordering law chosen for the numbering. In other words, each verification module 24A, 24B, 24D is adapted for verifying that the version of each of the other complementary device(s) is at least as recent as the corresponding minimum required version when the version numbering evolves over time.

This verification is done by each verification module 24A, 24B, 24D for each considered function from among the hardware and software functions and for each compatibility level chosen independently for each considered function.

In the described example, the third device 12C does not comprise a verification module and then comprises the delegating module 28.

Alternatively, each electronic device comprises its own verification module. In other words, each compatibility verification is done independently by each respective device, without going through a delegating module.

Each generating module 26A, 26B, 26D is adapted for generating a unitary deviation indicator for each associated device 12A, 12B, 12D having an incompatibility with at least one other complementary device, as will be described in more detail below in light of FIGS. 5 and 6.

Furthermore, at least one generating module 26A, 26B, 26D is adapted for generating a global deviation indicator when two complementary devices are incompatible, as will be described in more detail below in light of FIG. 7.

Figure 6:
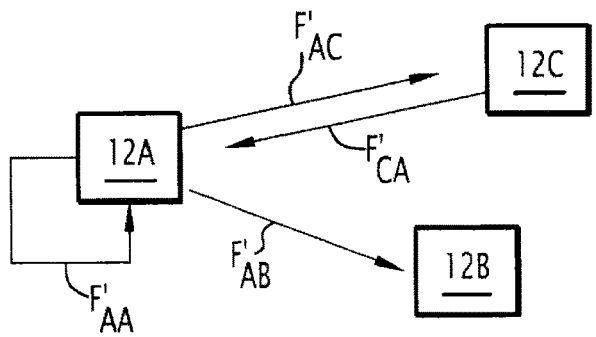

The delegating module 28 is adapted for sending another device comprising a verification module the values contained in the compatibility table 22C of the device that comprises said delegating module 28, the other device for example being the first device 12A comprising the verification module 26A in the example of FIG. 6.

The delegating module 28 then makes it possible to verify the corresponding compatibility or compatibilities for the associated device 12C, then to generate any unitary deviation indicator for the associated device 12C, when that device 12C does not comprise a verification module or a generating module.

Figure 2:
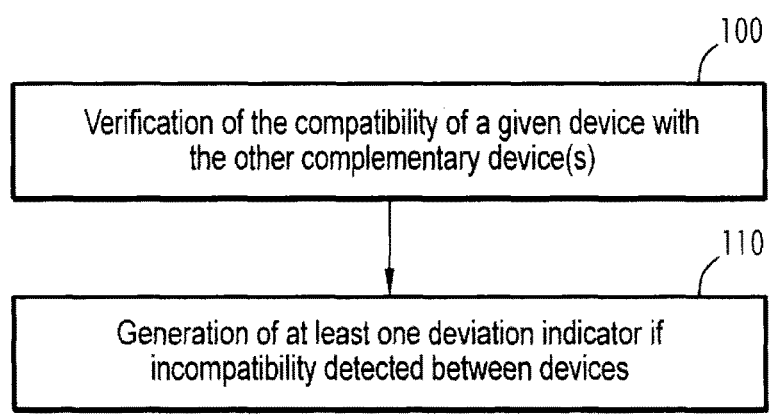
FIG. 2 is a flowchart of a method for generating at least one deviation indicator according to the invention, the method comprising verifying the compatibility of a given device with one or more other complementary devices.
Figure 3:
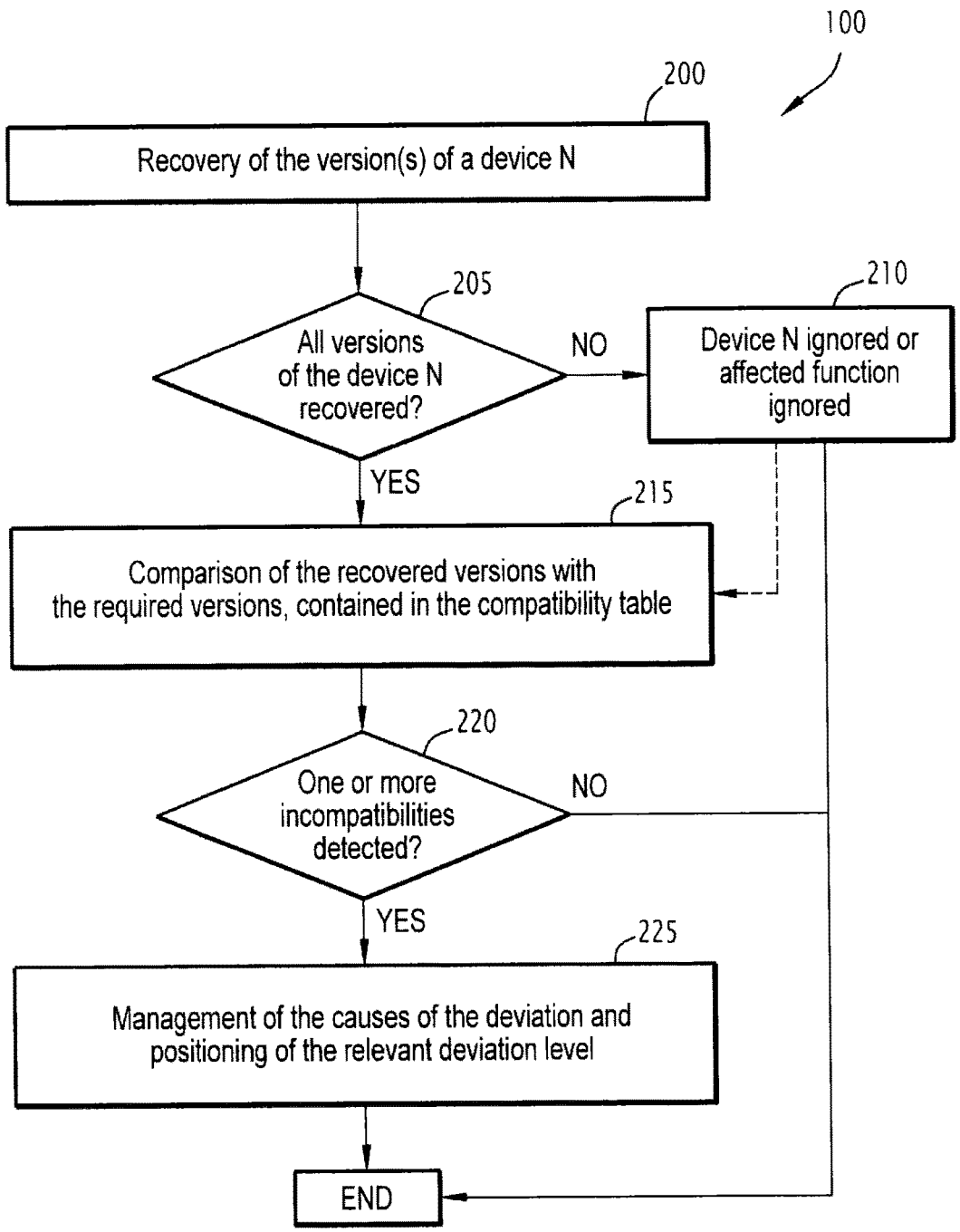
FIGS. 3 and 4 are flowcharts of steps carried out during the aforementioned compatibility verification.
Figure 4:
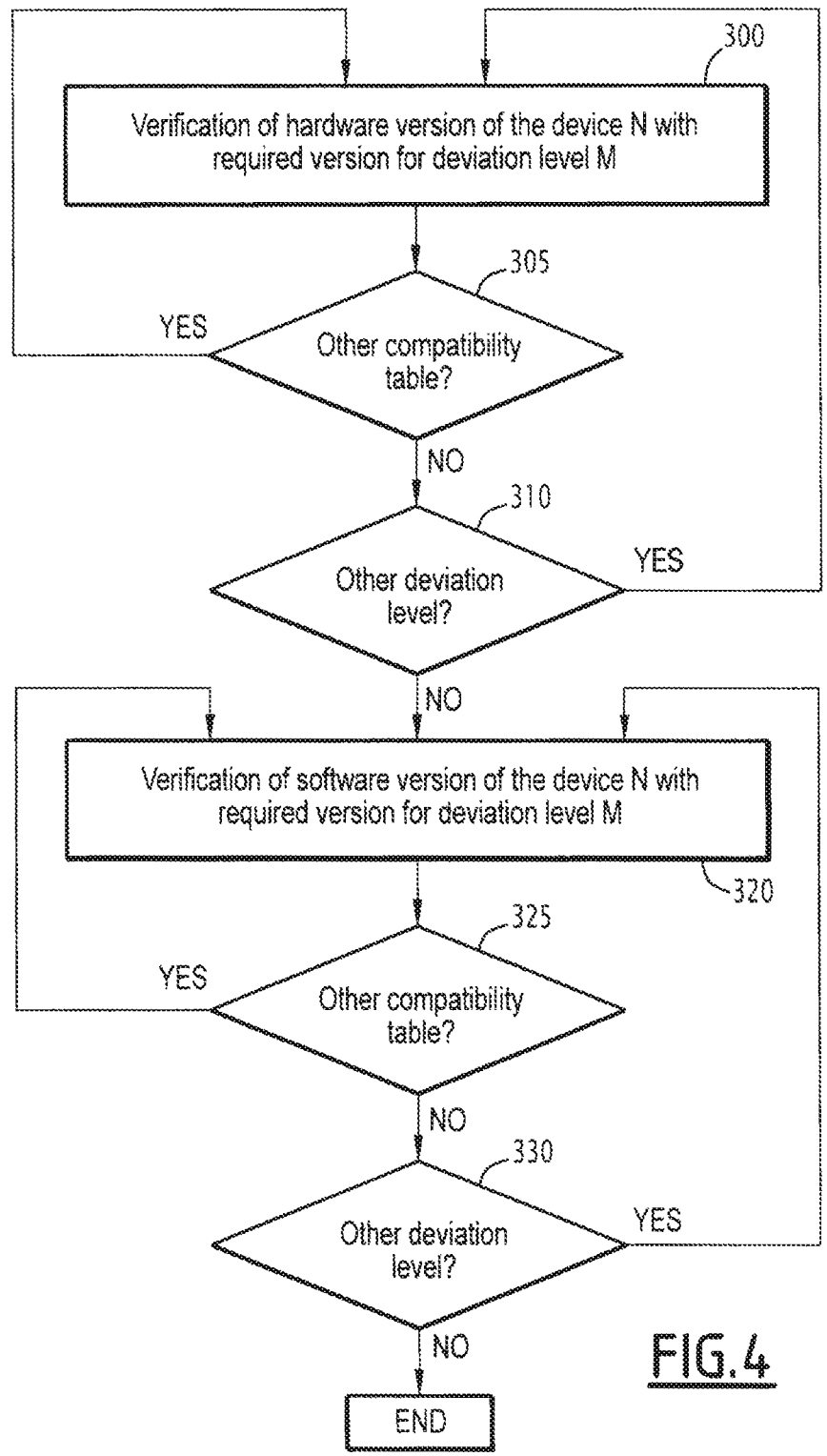

The operation of the electronic system 10 according to the invention will now be described in light of the flowcharts of FIGS. 2 to 4, illustrating the generating method according to the invention.

Said generating method comprises a step 100 during which the compatibility verification of one given device 12A, 12B, 12C, 12D with the other complementary device(s) is done. This verification is done using the compatibility table 22A, 22B, 22C, 22D contained in that device, the version number of each of said other complementary device(s) being compared with the corresponding minimum required version number, as will be described in more detail below in light of FIGS. 3 and 4.

The generating method next comprises the following step 110, during which at least one deviation indicator, such as a corresponding unitary indicator or the global indicator, is generated for the electronic device if an incompatibility with at least one other complementary device is detected.

The verification step comprises an initial step 200 for recovering the version number(s) of a complementary device, that complementary device being numbered N in the example of the flowchart of FIG. 3.

After having recovered one or more version numbers of the complementary device N, the verification module 24A, 24B, 24D of the device implementing the method according to the invention determines, during step 205, whether all of the expected version numbers associated with the complementary device N have indeed been recovered.

If all of these expected version numbers have not been recovered, then the verification module 24A, 24B, 24D ignores the complementary device N during step 210, or alternatively, ignores only the affected hardware or software function, while not prohibiting the operation of the other hardware and/or software function(s).

If all of these expected version numbers have indeed been recovered, then they are compared, during step 215 and by the verification module 24A, 24B, 24D, with the minimum required version numbers contained in the corresponding compatibility table 22A, 22B, 22D, as will be described in more detail below using the flowchart of FIG. 4.

In an alternative shown in dotted lines in FIG. 3, if certain expected version numbers have been recovered, and even if all of the expected version numbers have not been recovered, which creates a negative response to the test in step 205, then the method nevertheless goes on to step 215 so that the recovered version numbers are compared, by the verification module 24A, 24B, 24D, with the corresponding minimum required version numbers contained in the corresponding compatibility table 22A, 22B, 22D.

During the following step 220, the verification module 24A, 24B, 24D determines whether one or more incompatibilities have been detected, i.e., whether one or more recovered version numbers are strictly lower, within the meaning of the ordering law for the version numbering, than the minimum required version numbers contained in the corresponding compatibility table 22A, 22B, 22D.

If no incompatibility is detected during step 220, then the method is completed.

If, on the contrary, at least one incompatibility is detected, then the cause(s) having caused that version deviation leading to an incompatibility are managed during step 225 and a deviation level, i.e., a deviation indicator, is generated. Managing the causes of the version deviation for example leads to planning or automatically performing an update of the deviating version with respect to the minimum required version. Managing the causes of the version deviation for example also leads, as long as the update has not been done, to partially or completely deactivating each function affected by the detected incompatibility or incompatibilities, as well as reporting each incompatibility to the user. The step for managing the causes and positioning of the deviation indicator(s) then corresponds to step 110 of FIG. 2. The method ends at the end of that step 225.

The flowchart of FIG. 4 provides a more detailed illustration of the comparison step 215 in the case where the corresponding device 12A, 12B, 12C, 12D comprises both at least one hardware function and at least one software function.

During step 300, the verification module 24A, 24B, 24D of the device carrying out the method begins by verifying the hardware version number of the complementary device N, i.e., the version number of the hardware function of the device N, with the minimum required version number for a deviation level M. That verification consists of determining whether the hardware version number of the complementary device N is greater than or equal to the minimum version number required for the deviation level M, within the meaning of the ordering law associated with the version numbering.

After that step 300, the verification module 24A, 24B, 24D determines, during step 305, whether other compatibility tables must be taken into account for a new verification. This for example occurs in the case where the corresponding device 12A, 12B, 12C, 12D comprises several different compatibility tables 22A, 22B, 22C, 22D for different hardware and/or software functions, those functions being able to be updated independently of one another, or in the case where the delegating module 28 has sent the compatibility table 22C to the first device 12A, as will be described below with respect to FIG. 6.

If another compatibility table is present, then the verification module 24A, 24B, 24D returns to step 300 to perform that new hardware version verification with the other table.

Otherwise, the verification module 24A, 24B, 24D goes on to step 310, during which it determines whether other deviation levels are provided, or in other words whether other compatibility levels are provided.

If at least one other deviation level exists, then the verification module 24A, 24B, 24D returns to step 300 to perform that new hardware version verification with the other deviation level.

Otherwise, the verification module 24A, 24B, 24D goes on to step 320, during which it verifies the software version number of the complementary device N, i.e., the version number of the software function of the device N, with the minimum required version number for a deviation level M. This verification consists of determining whether the software version number of the complementary device N is greater than or equal to the minimum required version number for the deviation level M, within the meaning of the ordering law associated with the version numbering.

After that step 320, the verification module 24A, 24B, 24D determines, during step 325, whether other compatibility tables must be taken into account for a new verification. As previously described, this for example occurs in the case where the delegating module 28 has sent the compatibility table 22C to the first device 12A.

If another compatibility table is present, then the verification module 24A, 24B, 24D returns to step 320 to perform that new software version verification with the other table.

Otherwise, the verification module 24A, 24B, 24D goes on to step 330, during which it determines whether other deviation levels are provided, or in other words whether other compatibility levels are provided.

If at least one other deviation level exists, then the verification module 24A, 24B, 24D returns to step 320 to perform that new software version verification with the other deviation level. Otherwise, the comparison step 215 corresponding to the flowchart of FIG. 4 is completed.

In the example embodiment of FIG. 5, each device, i.e., the first device 12A, the second device 12B and the fourth device 12D, comprises its own verification module 24A, 24B, 24D and is adapted for performing its own compatibility verification with the other complementary devices of the system 10. The first device 12A then uses its compatibility table 22A to verify its compatibility with the second device 12B (arrow $F_{AB}$) on the one hand, and with the fourth device 12D (arrow $F_{AD}$) on the other hand. Similarly, the second device 12B then uses its compatibility table 22B to verify its compatibility with the first device 12A (arrow $F_{BA}$) on the one hand, and with the fourth device 12D (arrow $F_{BD}$) on the other hand. Lastly, the fourth device 12D then uses its compatibility table 22D to verify its compatibility with the first device 12A (arrow $F_{DA}$) on the one hand, and with the second device 12B (arrow $F_{DB}$) on the other hand.

In the example embodiment of FIG. 6, at least one device, i.e., the third device 12C, does not comprise its own verification module and is adapted for using its delegating module 28 to delegate the verification of its compatibility with the other complementary devices of the system 10 to the first device 12A. To that end, the third device 12C begins by sending the minimum required version number(s) contained in its compatibility table 22C to the first device 12A (arrow $F'_{CA}$). The first device 12A then uses the received compatibility table 22C to verify, on behalf of the third device 12C, the compatibility of said third device 12C with itself, i.e., the first device 12A (arrow $F'_{AA}$), on the one hand, and with the second device 12B (arrow $F'_{AB}$) on the other hand. The first device 12A next returns the result(s) of the verifications done using the received compatibility table 22C to the third device 12C (arrow $F'_{AC}$).

Each device 12A, 12B, 12C, 12D is in fact preferably adapted for storing the results of the compatibility verifications in its memory 18A, 18B, 18C, 18D, whether those verifications have been done directly by said device or indirectly by another device via the aforementioned delegating mechanism. In other words, each device 12A, 12B, 12C, 12D is preferably adapted for storing any unitary deviation indicator it may have in its memory 18A, 18B, 18C, 18D.

As an example, the unitary deviation indicator is positioned in an "alarming" state when at least one compatibility between the corresponding device 12A, 12B, 12C, 12D and a respective complementary device is detected, that incompatibility causing only partial operation of at least one hardware or software function of said corresponding device 12A, 12B, 12C, 12D. The unitary deviation indicator is for example positioned in a "critical" state when at least one detected incompatibility causes the malfunction of at least one hardware or software function of said corresponding device 12A, 12B, 12C, 12D. One skilled in the art will of course understand that other state values are possible for the unitary deviation indicator, and also that the "alarming" and "critical" states may be positioned according to other conditions.

Figure 7:
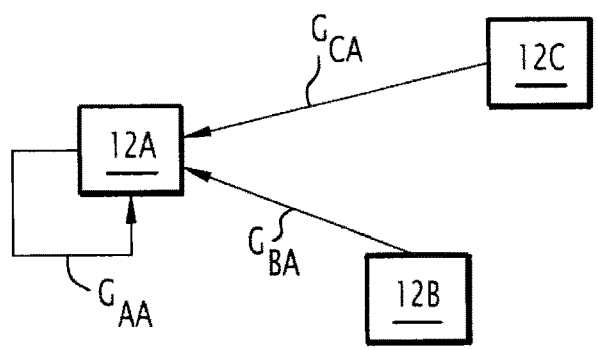

When a corresponding device 12A, 12B, 12C, 12D is incompatible with a respective complementary device, the global deviation indicator is calculated by the corresponding device, such as the first device 12A in the example of FIG. 7. To that end, the first device 12A begins by recovering any unitary deviation indicator of the second device 12B (arrow $G_{BA}$), then any unitary deviation indicator of third device 12C (arrow $G_{CA}$), knowing that its own potential unitary deviation indicator is already stored in its own memory 18A. The first device 12A then calculates the global deviation indicator (arrow $G_{AA}$) using any recovered unitary deviation indicators and any unitary deviation indicator it may have stored in its memory 18A.

As an example, the global deviation indicator has a highest priority, also called rank 1 priority, when at least one unitary deviation indicator is in the "critical" state for at least one hardware function. The next lower priority, also called rank 2 priority, of the global deviation indicator corresponds to the case where at least one unitary deviation indicator is in the "critical" state for at least one software function, with no unitary deviation indicator in the "critical" state for a hardware function. The next lower priority, also called rank 3 priority, of the global deviation indicator corresponds to the case where at least one unitary deviation indicator is in the "alarming" state for at least one hardware function, with no unitary deviation indicator in the "critical" state. Lastly, the lowest priority, also called rank 4 priority, corresponds to the case where at least one unitary deviation indicator is in the "alarming" state for at least one software function, with no unitary deviation indicator in the "critical" state, as well as no unitary deviation indicator in the "alarming" state for a hardware function.

The system 10 then comprises a man-machine interface, not shown, to alert the user if a deviation is detected, or if an incompatibility is detected. The man-machine interface comprises a light-emitting diode, not shown, arranged on each device 12A, 12B, 12C, 12D, and a law for example based on the number of light flashes of the light-emitting diode then makes it possible to indicate the detected deviation level and the associated type of function from among the hardware and/or software functions to the user.

As an example, three light flashes of the light-emitting diode correspond to an alarming deviation for the firmware function, three light flashes of the diode correspond to alarming deviation for the hardware function, six light flashes correspond to a critical deviation for the firmware function and seven light flashes correspond to a critical deviation for the hardware function.

The electronic system 10 and the method according to the invention are then particularly independent due to the distribution of the compatibility tables 22A, 22B, 22C, 22D in the memories of each of the devices 12A, 12B, 12C, 12D. No device is then mandatory to perform the compatibility verification, unlike the system of the state of the art, where the verification cannot be done without a master device. The compatibility verification is also not sensitive to the disconnection, i.e., removal, of a device from the system, one consequence being that the removed device is neutralized or ignored (step 210 previously described) and the compatibility of the other devices with the removed device is no longer verified. If the removed device was incompatible with a complementary device, then any unitary deviation indicator it might have is ignored in computing the global deviation indicator. Furthermore, all of the other unitary deviation indicators are recalculated, since any incompatibilities associated with the removed device are no longer occurring.

Similarly, the compatibility verification is particularly upgradable when a device is added into the system 10, since it suffices for the added device to perform its own compatibility verification with the complementary devices already present in the system 10, using its compatibility table stored in its memory.

Thus, the distributed compatibility verification architecture according to the invention makes it possible to offer good reliability with no additional cost and low sensitivity to outside stresses. It also allows it to be less affected by design choices, given that adding a device to the system or removing a device from the system is easily managed by the presence of a compatibility table in each device 12A, 12B, 12C, 12D of the system.

One can then see that the electronic device 10 according to the invention is a more upgradable system in which the compatibility verification between devices 12A, 12B, 12C, 12D remains easy to implement, even when a new device is added to the system 10.

The invention claimed is:

1. An electronic system including a set of electronic devices, each electronic device comprising a memory and a communication module for communicating with one or more other complementary electronic devices of the set, the electronic system comprising:
   a first electronic device of the set of electronic devices;
   a second electronic device of the set of electronic devices configured to receive a request of delegation of compatibility verification from the first electronic device, the second electronic device including a verification module implemented by circuitry and configured to verify compatibility of the first electronic device with a third electronic device of the other complementary electronic device(s) with which said second electronic device is configured to communicate, the third electronic device also including a verification module; and
   at least one generating module implemented by the circuitry and configured to generate at least one deviation indicator when an incompatibility is detected between two electronic devices, wherein
   said each memory of said each electronic device comprises a compatibility table for defining compatibility with said other complementary electronic device(s), each compatibility table comprising at least one minimum required version number for each of said other complementary electronic device(s), said verification module of the second electronic device is then configured to compare, for the first electronic device, a version number of the third electronic device, which itself includes a verification module, with the corresponding minimum required version number, and the first electronic device includes a delegation module, without including a verification module, the delegation module being configured to delegate the compatibility verification to the second electronic device that includes the verification module, and the delegating module of the first electronic device is configured to send to said verification module of the second electronic device the version number contained in the compatibility table of the first electronic device.

2. The electronic system according to claim 1, wherein at least one electronic device of the set of electronic devices comprises at least one hardware function, and each corresponding compatibility table comprises, for said at least one hardware function, a minimum required version number for each of the other complementary electronic device(s).

3. The electronic system according to claim 1, wherein at least one electronic device of the set of electronic devices comprises at least one software function, and each corresponding compatibility table comprises, for each software function, a minimum required version number for each of the other complementary electronic device(s).

4. The electronic system according to claim 1, wherein said at least one generating module is configured to generate a unitary deviation indicator for each electronic device having an incompatibility with at least one other complementary electronic device.

5. The electronic system according to claim 1, wherein at least one generating module is configured to generate a global deviation indicator when two complementary electronic devices are incompatible.

6. The electronic system according to claim 1, wherein several compatibility levels are associated with at least one electronic device of the set of electronic devices, and each corresponding compatibility table comprises, for each compatibility level, a minimum required version number for each of said other complementary electronic device(s).

7. An electric circuit breaker comprising a triggering unit and the electronic system according to claim 1.

8. The electronic system according to claim 1, wherein each electronic device that includes a delegation module does not include a verification module.

9. The electronic system according to claim 1, wherein the compatibility table comprises a first minimum required version number of firmware for each of said other complementary electronic device(s), a second minimum required version number of hardware for each of said other complementary electronic device(s), and an indication of compatibility level associated with a combination of the first minimum required version number of firmware and the second minimum required version number of hardware.

10. A method for generating at least one deviation indicator for an electronic device when an incompatibility with at least one other electronic device of an electronic system is detected, the electronic system comprising a set of electronic devices, each electronic device comprising a memory and a communication module for communicating with one or more other complementary electronic devices of the set, the method comprising:

receiving, by a second electronic device of the set of electronic devices, a request of delegation of compatibility verification from a first electronic device of the set of electronic devices;

verifying, by a verification module included in the second electronic device, compatibility of the first electronic device with a third electronic device of the other complementary electronic device(s) with which said second electronic device is configured to communicate, the third electronic device also including a verification module;

generating at least one deviation indicator for the electronic device when an incompatibility with at least one other complementary electronic device is detected, wherein the memory of each electronic device comprises at least one compatibility table for defining compatibility with said other complementary electronic device(s), each compatibility table comprising at least one minimum required version number for each of said other complementary electronic device(s);

during the verifying by the verification module of the second electronic device, comparing a version number for the first electronic device with the corresponding minimum required version number, wherein the receiving receives the request of delegation from a delegation module included in the first electronic device, the delegation module delegating the verifying of the compatibility to the second electronic device that comprises the verification module; and receiving, by said verification module of the second electronic device, the version number contained in the compatibility table of the first electronic device.

11. A non-transitory computer readable medium including a computer program product comprising software instructions which, when run by a computer, carry out the method according to claim 10 for generating at least one deviation indicator.

12. The method according to claim 10, wherein each electronic device that includes a delegation module does not include a verification module.

13. The method according to claim 10, wherein the compatibility table comprises a first minimum required version number of firmware for each of said other complementary electronic device(s), a second minimum required version number of hardware for each of said other complementary electronic device(s), and an indication of compatibility level associated with a combination of the first minimum required version number of firmware and the second minimum required version number of hardware.

* * * * *